US012623976B2

(12) United States Patent
Hayashi et al.

(10) Patent No.: US 12,623,976 B2
(45) Date of Patent: May 12, 2026

(54) METHOD FOR PRODUCING METAL MATRIX COMPOSITE AND METHOD FOR PREPARING PREFORM

(71) Applicant: ADVANCED COMPOSITE CORPORATION, Fuji (JP)

(72) Inventors: Mutsuo Hayashi, Fuji (JP); Zhipu Pei, Fuji (JP); Pailin Silipattanakitkul, Fuji (JP)

(73) Assignee: ADVANCED COMPOSITE CORPORATION, Fuji (JP)

( * ) Notice: Subject to any disclaimer, the term of this patent is extended or adjusted under 35 U.S.C. 154(b) by 735 days.

(21) Appl. No.: 18/000,485

(22) PCT Filed: Feb. 8, 2022

(86) PCT No.: PCT/JP2022/004952
§ 371 (c)(1),
(2) Date: Dec. 1, 2022

(87) PCT Pub. No.: WO2022/224549
PCT Pub. Date: Oct. 27, 2022

(65) Prior Publication Data
US 2023/0234894 A1      Jul. 27, 2023

(30) Foreign Application Priority Data

Apr. 19, 2021      (JP) ................................. 2021-070609

(51) Int. Cl.
*C04B 41/51*          (2006.01)
*C04B 41/00*          (2006.01)
(Continued)

(52) U.S. Cl.
CPC ...... *C04B 41/5155* (2013.01); *C04B 41/0072* (2013.01); *C04B 41/4517* (2013.01);
(Continued)

(58) Field of Classification Search
CPC .............................................. C04B 2235/3427
See application file for complete search history.

(56) References Cited

U.S. PATENT DOCUMENTS

| | | | |
|---|---|---|---|
| 5,010,945 A | 4/1991 | Burke | |
| 5,395,701 A | 3/1995 | White et al. | |
| 5,641,817 A * | 6/1997 | Aghajanian ............. | B22C 1/205 |
| | | | 523/141 |

FOREIGN PATENT DOCUMENTS

| | | | |
|---|---|---|---|
| CN | 108165836 | 6/2018 | |
| CN | 108165836 A * | 6/2018 | ........... C22C 1/1073 |

(Continued)

OTHER PUBLICATIONS

Extended European Search Report, issued in the corresponding European patent application No. 22791332.4, dated Mar. 5, 2024, 10 pages.

(Continued)

*Primary Examiner* — Robert A Vetere
(74) *Attorney, Agent, or Firm* — HSML P.C.

(57) ABSTRACT

The present invention relates to a technique of dramatically improving a method for causing a molten metal of an Al alloy or the like to infiltrate without pressurization into a preform obtained by molding and hardening a ceramic powder, and obtaining "a metal matrix composite formed from a ceramic powder and an Al alloy or the like" in a uniform state as a whole more simply and stably, and the present invention provides "a production method for producing a metal matrix composite containing aluminum and ceramic, the method including: obtaining a mixed body by performing molding using a mixture containing a magnesium-containing powder, a ceramic powder, and an inorganic or organic/inorganic binder that is hardened when heated to 500° C. or lower; preparing a preform by calcining the mixed body at a temperature of 500° C. or lower; and (Continued)

causing an Al alloy or the like to infiltrate without pressurization into the obtained preform to produce the metal matrix composite containing aluminum and ceramic, and a method for preparing the preform."

7 Claims, 3 Drawing Sheets

(51) Int. Cl.
  *C04B 41/45*      (2006.01)
  *C22C 1/10*       (2023.01)
(52) U.S. Cl.
  CPC ........ *C22C 1/10* (2013.01); *C04B 2235/3427* (2013.01); *C04B 2235/402* (2013.01); *C04B 2235/616* (2013.01); *C04B 2235/658* (2013.01)

(56)        References Cited

FOREIGN PATENT DOCUMENTS

| | | | | |
|---|---|---|---|---|
| JP | 2641901 | 8/1997 | | |
| JP | 2930991 | 8/1999 | | |
| JP | 11-241130 | 9/1999 | | |
| JP | H11-264032 | 9/1999 | | |
| JP | 2002-194456 | 7/2002 | | |
| JP | 2010-258458 | 11/2010 | | |
| WO | 99/32680 | 7/1999 | | |
| WO | WO-9932680 A2 * | 7/1999 | ............. | C04B 41/88 |

OTHER PUBLICATIONS

International Preliminary Report on Patentability, issued in the corresponding PCT Application No. PCT/JP2022/004952, dated Oct. 24, 2023, 4 pages (enclosed translation only).

International Search Report, issued in the corresponding PCT application No. PCT/JP2022/004952, dated Apr. 12. 2022, 5 pages (including translation).

Chinese Office Action, issued in the corresponding Chinese patent application No. 202280004792.2, dated Feb. 8, 2024, 14 pages (including English translation).

* cited by examiner

[Figure 1]
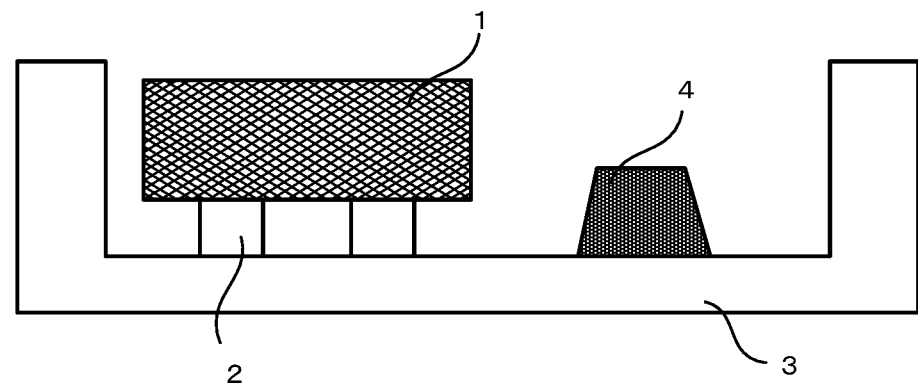
[Figure 2(a)]
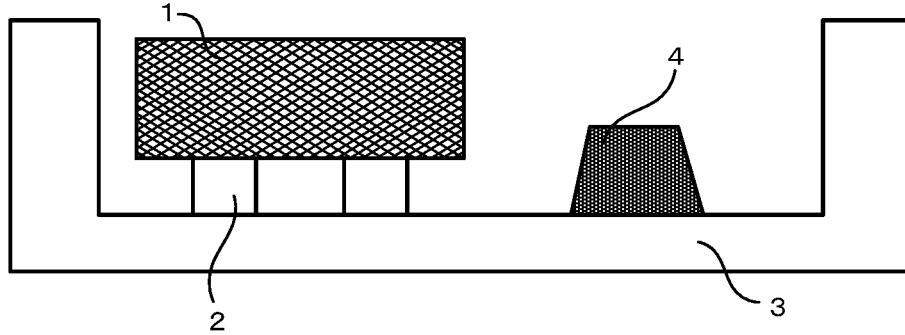

[Figure 2(b)]
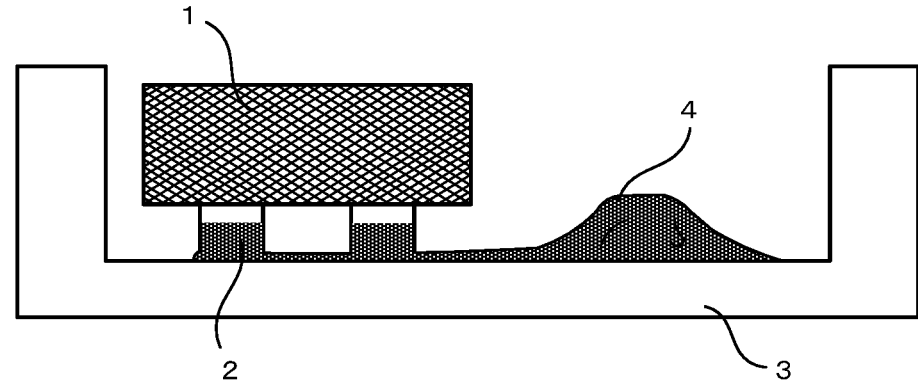
[Figure 2(c)]
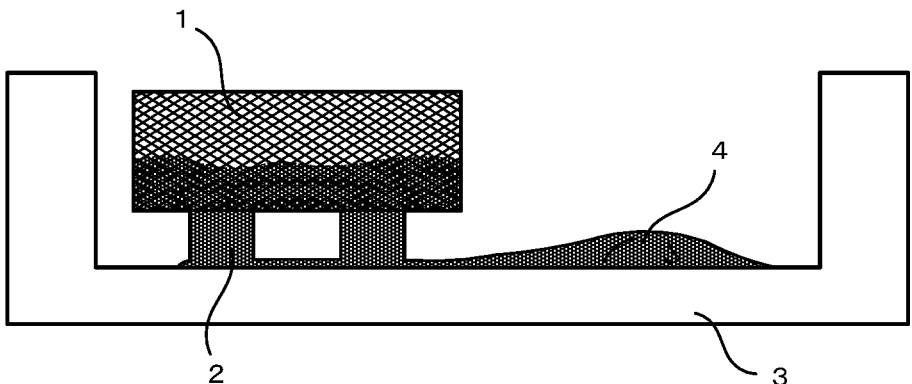

[Figure 2(d)]
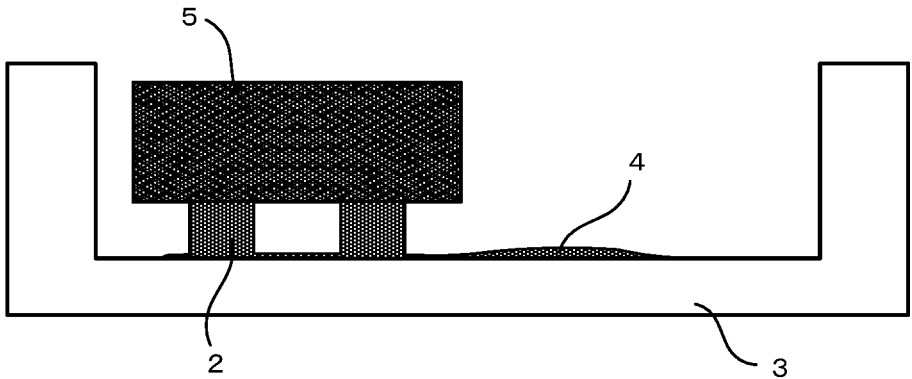

METHOD FOR PRODUCING METAL MATRIX COMPOSITE AND METHOD FOR PREPARING PREFORM

TECHNICAL FIELD

The present invention relates to a method for producing a composite for obtaining a metal matrix composite formed from a ceramic powder and metal aluminum (Al) or an Al alloy, and a method for preparing a preform that can be used in the production method. In more detail, the present invention relates to a technique capable of dramatically improving productivity and product quality of a metal-ceramic composite obtained by forming a composite between an aluminum-based metal matrix and a ceramic powder as a reinforcing material.

BACKGROUND ART

Recently, an aluminum-based metal matrix composite obtained by forming a composite between an Al alloy or the like and ceramic has been widely used as machine components and as semiconductor/liquid crystal producing apparatuses, robot arms, and the like because of light weight, high strength, and high rigidity. In addition, the aluminum-based metal matrix composite has also been widely used for a heat sink, heat radiation spreader, and the like as a high thermal conductivity and low thermal expansion material.

A composite formed from a ceramic powder and an Al alloy or the like, is a kind of so-called MMCs (metal matrix composites), and is usually produced by a method such as a high-pressure impregnation method, a casting method, and a pressureless infiltration process.

The high-pressure impregnation method is a method in which a molten metal of an Al alloy or the like is forcibly caused to infiltrate into a ceramic powder or a molded body (preform) of a ceramic powder with a high-pressure press to form a composite between the ceramic powder and the Al alloy or the like. In the high-pressure impregnation method, since impregnation with the molten Al alloy or the like is performed at a high pressure, an expensive apparatus such as a press machine is necessary. Further, in a usual method, since impregnation cannot be performed in a product shape, it is necessary to detach a product from a press impregnation object surrounded by an Al alloy or the like by processing, and thus there is a problem that the processing cost for obtaining the product shape is required.

In the casting method, a ceramic powder such as silicon carbide or alumina is stirred at a high speed in a molten metal of an Al alloy or the like to prepare a ceramic powder-containing Al alloy molten metal, and the ceramic powder-containing Al alloy molten metal is cast into a conventional mold such as a sand mold, a metal mold, or a lost wax mold to produce a composite body of the ceramic and the Al alloy or the like. In this method, when the content of the ceramic powder in the metal matrix is high, flowability of the molten metal lowers, and therefore, an upper limit of the content of the ceramic powder in the composite body is generally set to 30 v %, and thus there is a problem that the content ratio of the ceramic in the composite body is low.

The pressureless infiltration process is a process in which a molten metal of an Al alloy or the like is caused to infiltrate without pressurization into a ceramic powder filled body or molded body (preform) in an atmosphere of Mg and nitrogen to impregnate the preform or the like with the molten metal, thereby obtaining a composite body. For example, a preform is obtained by adding an inorganic binder such as silica to a powder filled body of a ceramic powder such as SiC or alumina or a ceramic powder and then performing molding and calcining a resultant mixture. Then, a molten metal of an Al alloy or the like is caused to infiltrate without pressurization into gaps of the ceramic powder at a temperature of approximately 700° C. or higher at which the Al alloy or the like is melted under a nitrogen and Mg evaporation atmosphere to produce a composite body of the ceramic powder and the Al alloy or the like. This principle of the pressureless infiltration process is as follows: that is, when the atmosphere is set to the Mg and nitrogen atmosphere, thereby wettability between the ceramic and the Al alloy or the like is improved, and a so-called capillary phenomenon is promoted, so that the molten metal of the Al alloy or the like is caused to infiltrate without pressurization into the gaps (voids) of the powder filled body or the preform.

In the pressureless infiltration process, when a ceramic filling rate is increased to decrease voids, thereby the ceramic filling rate in the composite body can be increased, and therefore it is possible to produce a composite body (MMC) of ceramic and an Al alloy in which physical property values such as a Young's modulus, a thermal conductivity, and a thermal expansion coefficient are high. In addition, when the composite body is produced by using a preform, the Al alloy can be caused to infiltrate while maintaining a shape of the preform. Accordingly, the pressureless infiltration process has attracted attention as a method for producing a MMC composite body in a near-net shape close to a product shape that does not require large-scale processing.

In the past, various studies have been made on the pressureless infiltration process. For example, in Patent Literature 1, when producing a metal matrix composite is produced by causing a molten Al alloy to infiltrate into a permeable material formed from a ceramic filler material by means of natural infiltration, it is proposed to prepare the Al alloy in such a way as to contain at least 3% by weight of magnesium. In addition, Patent Literature 1 discloses that the Al alloy containing magnesium wets ceramic, and therefore favorable joining between the metal and the ceramic is expected.

In addition, Patent Literature 2 proposes as follows: that is, when a source of a matrix metal is disposed in adjacent to a substantially non-reactive filler, and the matrix metal spontaneously is caused to infiltrate into the filler, an infiltration promoter precursor is allowed to exist. Patent Literature 2 describes as follows: when an atmosphere for infiltration contains nitrogen, a substance selected from calcium, magnesium, and strontium is used as the infiltration promoter precursor. In addition, Patent Literature 2 describes as follows: when such an infiltration promoter is provided to a spontaneous system, thereby spontaneous infiltration can be performed.

CITATION LIST

Patent Literature

Patent Literature 1: Japanese Patent No. 2641901
Patent Literature 2: Japanese Patent No. 2930991

SUMMARY OF INVENTION

Technical Problem

With regard to the above-described conventional techniques, the present inventors have given attention to the pressureless infiltration process in which the content ratio of the ceramic powder in the composite body can be increased without a need for an expensive apparatus such as a press machine that is used in the high-pressure impregnation method, and the metal matrix composite (MMC composite body) can be produced in a near-net shape close to a product shape, and the present inventors have recognized that when the production method can be improved into more excellent one, further utilization of "a metal matrix composite formed from a ceramic powder and an Al alloy or the like" can be promoted.

Accordingly, an object of the present invention is to dramatically improve a method of causing a molten metal of metal Al or an Al alloy (Al alloy or the like) to infiltrate without pressurization into a preform obtained by molding and hardening a ceramic powder in particular, and to develop an improved technique of a pressureless infiltration process capable of providing more simply and stably "a metal matrix composite formed from a ceramic powder and an Al alloy or the like" in a uniform state as a whole. Another object of the present invention is to provide a preform preparation technique that can be suitably utilized in the pressureless infiltration process and can thereby more efficiently produce a metal matrix composite in comparison to conventional methods by using a simple method of molding a mixture containing a ceramic powder, and calcining and hardening (solidifying) a resultant molded product.

Solution to Problem

The above-described objects are accomplished by the following method for producing a composite. That is, the present invention provides the following method for producing a metal matrix composite, wherein a metal matrix composite containing an Al alloy or the like and ceramic is produced.

[1] A method for producing a composite, including: obtaining a mixed body by performing molding using a mixture which contains a magnesium-containing powder, a ceramic powder, and an inorganic or organic/inorganic binder that hardens when heated to 500° C. or lower and to which an organic solvent or a water content-reduced mixed solvent of an organic solvent and water is further added; preparing a preform by calcining the mixed body at a temperature of 500° C. or lower; and causing metal aluminum or an aluminum alloy to infiltrate without pressurization into the obtained preform in a nitrogen atmosphere to produce a metal matrix composite containing aluminum and ceramic.

As a preferred embodiment of the above-described method for producing a composite of the present invention, the following embodiments can be exemplified.

[2] The method for producing a composite according to [1], wherein the magnesium-containing powder is a powder being at least any one selected from the group consisting of metal magnesium, a magnesium alloy, and magnesium silicide and having an average particle size of 0.5 μm or larger and 150 μm or less.

[3] The method for producing a composite according to [1] or [2], wherein the magnesium-containing powder is contained in the mixture within a range of 0.3% or more and 10% or less based on 100 parts by mass of the ceramic powder in terms of magnesium on a mass basis.

[4] The method for producing a composite according to any one of any one of [1] to [3], wherein the inorganic binder is water glass, and the organic/inorganic binder is any one selected from the group consisting of a silicone resin, a Si alkoxide, and an Al alkoxide.

[5] The method for producing a composite according to any one of [1] to [4], wherein the water content-reduced mixed solvent contains water in a range of 100 parts by mass or less based on 100 parts by mass of the organic solvent.

In addition, the present invention provides the following method for preparing a preform as another embodiment.

[6] A method for preparing a preform, the method being for preparing a ceramic preform that is applicable to production of an aluminum-based metal matrix composite by utilizing a pressureless infiltration process, and including: obtaining a mixed body by performing molding using a mixture which contains a magnesium-containing powder, a ceramic powder, and an inorganic or organic/inorganic binder that is hardened when heated to 500° C. or lower and to which an organic solvent or a water content-reduced mixed solvent of an organic solvent and water is further added; and obtaining a preform by calcining the obtained mixed body at a temperature of 500° C. or lower. The water content-reduced mixed solvent preferably contains water in a range of 100 parts by mass or less based on 100 parts by mass of the organic solvent.

Advantageous Effects of Invention

According to the present invention, a method for producing a composite by causing a molten metal of an Al alloy or the like to infiltrate without pressurization into a preform obtained by molding and hardening a ceramic powder in particular is dramatically improved, and thus it is possible to provide more simply and stably a technique of providing "a metal matrix composite formed from a ceramic powder and an Al alloy or the like" that is uniform as a whole. According to the present invention, there is provided a novel preform preparation technique that can be suitably utilized in the pressureless infiltration process and can efficiently and stably produce a metal matrix composite in a favorable state by utilizing a simple method for molding a mixture containing a ceramic powder, and calcining and hardening (solidifying) a resultant molded product.

BRIEF DESCRIPTION OF DRAWINGS

FIG. 1 is a schematic diagram for explaining an arrangement state inside a container that is used in a pressureless infiltration process that is used in a method for producing a composite of the present invention.

FIG. 2(*a*) is a first schematic diagram for explaining a state before a molten metal infiltrates into a preform and the preform is impregnated with the molten metal by a pressureless infiltration process that is carried out in a method for producing a composite of the present invention.

FIG. 2(*b*) is a second schematic diagram for explaining a state in which the molten metal infiltrates into the preform and the impregnation of the preform with the molten metal starts by the pressureless infiltration process that is carried out in the method for producing a composite of the present invention.

FIG. 2(*c*) is a third schematic diagram for explaining a state in which the molten metal infiltrates into the preform and the impregnation of the preform with the molten metal proceeds by pressureless infiltration process that is carried out in the method for producing a composite of the present invention.

FIG. 2(d) is a fourth schematic diagram for explaining a state in which the molten metal infiltrates into the whole of the preform and the preform has been impregnated with the molten metal by the pressureless infiltration process carried out in the method for producing a composite of the present invention.

DESCRIPTION OF EMBODIMENTS

Hereinafter, preferred embodiments of the present invention will be described, but the present invention is not limited to the embodiments.

First, description will be given on an overview of a general procedure of a pressureless infiltration process using a preform which has been carried out in the past to produce a metal matrix composite (hereinafter, also referred to simply as composite or composite body) that is formed from a ceramic powder and an Al alloy or the like and has been studied in the present invention. First, a mixed raw material obtained by adding an organic binder such as polyvinyl alcohol or polyvinyl butyral and, if necessary, an inorganic binder such as colloidal silica or colloidal alumina to a ceramic powder is prepared. Next, the above-described mixed raw material is molded by a method such as press molding, slip casting, extrusion molding, or a vibration method to obtain a mixed body. Then, the obtained mixed body is calcined at a temperature of approximately 800° to approximately 1200° C. to prepare a preform.

The metal matrix composite is prepared by the pressureless infiltration process as described below using the preform obtained in the manner as described above. As shown in FIG. 1 and FIG. 2(a), a preform 1 and an Al alloy or the like 4 are disposed inside a container 3 made of carbon or the like, and this container 3 is put into a box furnace (not shown) to which a metal Mg powder is inserted. The temperature of the inside of this box furnace is set to approximately 700° C. or higher by heating the inside while causing nitrogen to flow to the inside, thereby evaporating Mg disposed inside the box furnace and maintaining the inside of the box furnace in a nitrogen atmosphere state. Then, as shown in FIG. 2(b) to FIG. 2(d), the Al alloy or the like 4 is melted due to heating, and a molten metal infiltrates into gaps of the preform 1 through an infiltration channel 2, thereby obtaining a MMC composite body 5 in which the preform 1 is impregnated with the Al alloy or the like 4.

Hereinafter, the principle of the pressureless infiltration process that is utilized in production of this MMC composite body will be described. In an atmosphere in which infiltration of the molten Al alloy or the like into the preform is performed, a Mg powder evaporates and reacts with nitrogen to generate $Mg_3N_2$, and the generated $Mg_3N_2$ is deposited on a ceramic powder surface of the preform disposed in the container inside the box furnace. Wettability between the ceramic powder and the molten metal of the Al alloy or the like is generally poor. However, when $Mg_3N_2$ exists on the ceramic powder surface, the wettability with the Al alloy or the like is dramatically improved. As a result, the molten metal of the Al alloy or the like wets on the ceramic powder that forms the preform, and infiltrates without pressurization into gaps (voids) of the ceramic powder that forms the preform due to a capillary phenomenon. In addition, the generated $Mg_3N_2$ and the aluminum metal cause a reaction of $Mg_3N_2+Al\rightarrow Mg+AlN$, an extremely thin AlN phase is generated on the ceramic surface, and this AlN phase also improves the wettability of the molten metal of the Al alloy or the like. The molten Al alloy or the like sequentially infiltrates into the preform while Mg vapor generated by this reaction infiltrates to the inside of the preform and the same reaction is repeated. In this manner, the molten metal of the Al alloy or the like infiltrates without pressurization into the whole of the preform, and the ceramic powder is impregnated with the molten metal.

However, according to studies conducted by the present inventors, the above-described process has the problems as described below. First, the above-described reaction does not occur in the whole of the preform from the start of infiltration. That is, at the start of infiltration, the reaction occurs firstly on a surface of the preform where both of Mg and $N_2$ exist, and the reaction sequentially proceeds to the inside of the preform. Therefore, there is a problem that long time is required to impregnate the whole of the surface and inside of the preform with the molten metal of the Al alloy or the like, and production efficiency is inferior. In addition, a portion where $Mg_3N_2$ is not generated occurs inside the preform, and the Al alloy or the like does not infiltrate into the whole of the preform, and due to this, a non-uniform impregnated body with the Al alloy or the like is produced, and a favorable composite cannot be produced in some cases.

The present inventors have conducted diligent studies in order to solve these problems and to develop a technique of dramatically improving a method of causing a molten metal of an Al alloy or the like to infiltrate without pressurization into a preform obtained by molding and hardening a ceramic powder, enabling rapid infiltration of the molten metal into the preform, and providing "a composite formed from a ceramic powder and an Al alloy or the like" in which uniform product quality is improved stably, and as a result, the present inventors have reached the present invention.

A method for producing a composite of the present invention has the following characteristics. First, a mixture that contains a magnesium-containing powder, such as a metal Mg powder, a ceramic powder, and an inorganic or organic/inorganic binder which has a property of allowing the mixture to exhibit strength when the inorganic or organic/inorganic binder is heated at 500° C. or lower is used as a raw material, and the mixture is molded to obtain a mixed body. As the above-described "property of allowing the mixture to exhibit strength when the inorganic or organic/inorganic binder is heated at 500° C. or lower," "property of being hardened when the inorganic or organic/inorganic binder is heated at 500° C. or lower," and the like can be exemplified. Further, the mixed body which has been molded is calcined at a temperature of 500° C. or lower to prepare a preform, and a molten metal of an Al alloy or the like is caused to infiltrate without pressurization into the obtained preform to produce a composite body containing the aluminum alloy and the ceramic. Particularly, the characteristic of the present invention is in that a novel preparation method capable of obtaining a preform having useful constitution that has not been disclosed in the past has been found by the above-described constitution. That is, when the preform having the above-described constitution is used, thereby it is possible to cause a molten metal of an Al alloy or the like to infiltrate rapidly without pressurization into the preform, and thus production of a composite body obtained by uniformly impregnating the preform with the Al alloy or the like has been realized. Hereinafter, each step in the method for producing the composite of the present invention will be described specifically.

<Preparation of Mixture Containing Magnesium-Containing Powder and Ceramic Powder>

The mixture that is used in the production method of the present invention contains a magnesium-containing powder, such as a metal Mg powder, and a ceramic powder, and further contains an inorganic or organic/inorganic binder which has a property of allowing the mixture to exhibit strength the inorganic or organic/inorganic binder is heated at 500° C. or lower. Hereinafter, these raw materials will be described.

(Ceramic Powder)

Although the ceramic powder that is used in the present invention is not particularly limited, any of the substances given below can be used. For example, general ceramic powders including carbides such as silicon carbide (Sic), tungsten carbide (WC), and TiC (titanium carbide), oxides such as alumina ($Al_2O_3$), titania ($TiO_2$), and aluminum borate, and nitrides such as aluminum nitride (AN) and silicon nitride ($Si_3N_4$) can be used.

Although the particle size of the above-exemplified ceramic powders is not particularly limited, for example, the ceramic powder having an average particle size of approximately 1 μm or larger and approximately 200 μm or smaller is appropriate. In a ceramic powder having an average particle size of less than 1 μm, for example, gaps (hole diameters) formed in the mixed body obtained by performing press molding or the like, or in the preform obtained by calcining the mixed body are excessively small, therefore, the molten Al alloy or the like may not infiltrate into the preform in some cases, and thus the ceramic powder having an average particle size of less than 1 μm is not appropriate. That is, in pressureless infiltration process, it is necessary for the molten Al alloy or the like to naturally infiltrate without pressurization into the gaps by a capillary phenomenon, but when the gaps (hole diameters) between particles of the ceramic powder are excessively small, the infiltration is insufficient. On the other hand, when the average particle size of the ceramic powder is larger than 200 μm, the particle size is excessively large, and therefore this case is not optimal from the viewpoint described below. If the average particle size of the ceramic powder is excessively large, when a mixed body is made by using a mixture containing such a ceramic powder, it is difficult to perform particle filling by press molding or vibration molding, making it difficult to perform the subsequent molding of the mixed body. In addition, in the case where a ceramic powder having an excessively large average particle size is used, the gaps between particles excessively increase to several tens of μm or larger, and therefore impregnation with aluminum by means of a capillary phenomenon that is important in the pressureless infiltration process is less likely to occur.

In the production method of the present invention, adjusting the size of the ceramic powder that is used in such a way as to obtain a preform having a required physical property value is also a preferred embodiment. For example, a ceramic powder of large particles and a ceramic powder of small particles are appropriately blended in accordance with an application to prepare a mixture, and a filled state of the ceramic powders in obtaining the mixed body is appropriately controlled by the obtained mixture, thereby it is possible to obtain a preform having a required physical property value.

(Magnesium-Containing Powder)

In the production method of the present invention, for example, at least any powder selected from the group consisting of metal magnesium, a magnesium alloy, and magnesium silicide can be used as the magnesium-containing powder. Specifically, powders of, for example, magnesium alloys such as an Al—Mg-based alloy and an Al—Mg—Si-based alloy, compounds such as $Mg_2Si$ in which the content of magnesium is high, and the like can be used in addition to the above-described metal magnesium powder.

In addition, it is preferable to use a magnesium-containing powder having an average particle size of 0.5 μm or larger and 150 μm or smaller. When a powder having an average particle size of larger than 150 μm is used, the powder is excessively rough, and therefore the powder may not be uniformly mixed with the above-described ceramic powder in some cases, and therefore such a magnesium-containing powder is not preferable. Further, when the particle size is rough, the surface area of the Mg-containing powder decreases, and therefore the amount of $Mg_3N_2$ that is generated after Mg contained in the preform reacts with nitrogen in an atmosphere and undergoes nitridization decreases. Here, when the amount of $Mg_3N_2$ that is generated is small, an aluminum impregnation speed to the preform is slow, and thus this case is not preferable. On the other hand, in the Mg-containing powder, the finer the powder is, the larger the surface area is, and as a result, such a Mg-containing powder is more likely to be oxidized by oxygen in the air into MgO, so that the amount of Mg decreases, and thus such a Mg-containing powder is not preferable. Accordingly, it is desirable to use a Mg-containing powder having an average particle size of 0.5 μm or larger. In addition, in the case where the average particle size is larger than 150 μm, the surface area of the whole decreases, and the amount of $Mg_3N_2$ that is generated decreases as described above, and therefore the Mg-containing powder having an average particle size of larger than 150 μm is not preferable.

With regard to the amount of the Mg-containing powder that is mixed, it is preferable to use the Mg-containing powder within a range of 0.3% or more and 10% or less in terms of Mg on a mass basis based on 100 parts by mass of ceramic powder. It is desirable to use the Mg-containing powder more preferably within a range of 0.5% or more and 7% or less, and still more preferably within a range of 0.5% or more and 5% or less. When the amount of the Mg-containing powder that is mixed is as small as less than 0.3%, the amount of $Mg_3N_2$ that is generated decreases, so that the infiltration speed of the molten metal of the Al alloy or the like is not sufficiently promoted, and therefore this range is not suitable. On the other hand, when the amount of the Mg-containing powder that is mixed is more than 10%, a distribution state of the Mg-containing powder in a preform that is prepared from these raw materials locally increases, and thus there is a risk that the amount of the Al alloy that has infiltrated may be non-uniform due to this, and therefore the amount of the Mg-containing powder being more than 10% is not suitable. When the Mg alloy or the Mg-containing compound as given above is used, the mixing amount may be determined in terms of Mg that is contained in the Mg alloy or the Mg-containing compound.

(Binder)

The present invention has a characteristic in that, as the mixture that is used in preparation of the preform, a mixture containing the above-described Mg-containing powder and ceramic powder, and further contains an inorganic or organic/inorganic binder having a property of being hardened when heated at 500° C. or lower and thereby allowing the mixture to exhibit strength is used. Examples of the organic/inorganic binder having the above-described property include a silicone resin, a Si alkoxide, and an Al alkoxide. In addition, examples of the inorganic binder include water glass, and alumina cement.

In the production method of the present invention, in the subsequent step, it is necessary to calcine a mixed body obtained by molding the mixture containing any of these binders at a temperature of 500° C. or lower to prepare the preform. Therefore, the binder having the property of allowing the mixture to exhibit strength when heated at 500° C. or lower is used so that the preform will exhibit strength at a calcining temperature of 500° C. or lower. In the present invention, an organic binder such as polyvinyl alcohol, polyvinyl butyral, and cellulose may further be added to the mixture so that the mixture containing the binder can be easily molded. These organic binders are combusted in the subsequent calcining step that is performed at a temperature of 500° C. or lower, and does not contribute to exhibition of the strength of the preform. Therefore, in the production method of the present invention, it is inevitable to use the inorganic/organic or inorganic binder having the above-described property when the mixture is prepared.

The binder that has the above-described property and can be suitably utilized in the present invention will be described giving examples. The silicon resin has a polysiloxane structure that is expressed by a chemical formula of "Si—O—R" (R represents an organic substance) and is composed of Si (silicon), oxygen, and an organic compound, and functions as an organic binder at a low temperature and functions as an inorganic binder after being calcined at a high temperature. In addition, the Si-alkoxide represented by $Si(OC_2H_5)_4$ becomes a polymer (silicone resin) from a monomer at a low temperature, and therefore when the mixed body is obtained by molding the mixture, the mixed body can maintain molding strength, and after calcining the mixed body, the Si-alkoxide finally becomes $SiO_2$ and functions as an inorganic binder. When a silicone resin in a solid state is used, the silicone resin is used after being dissolved in an alcohol such as ethanol or isopropyl alcohol (IPA), or an organic solvent such as xylene or toluene. A polymer of the Si-alkoxide is a liquid and can be used as it is or after being diluted. In the production method of the present invention, a silicone resin dissolved in an organic solvent in advance and a silicone resin that is itself a liquid can be used as they are. The above-described binder may be used after being diluted by adding an organic solvent or water thereto as necessary. This point will be described later.

In the present invention, water glass (sodium silicate) can be suitably used as the inorganic binder. In that case, it is preferable to use water glass in a solution form, so-called No. 1 water glass, No. 2 water glass, or No. 3 water glass, so that the water glass can be easily mixed with other materials. In addition, when alumina cement is used as the inorganic binder, it is preferable that the alumina cement be dissolved in a small amount of water, and a resultant mixture is mixed with other raw materials such as a ceramic powder.

Although the amount of the above-described binder that is used in the present invention depends on a molding method for preparing the mixed body, the amount is not particularly limited. Even in the case where any of the inorganic binder and the organic/inorganic binder is used, when the mixed body is calcined to obtain a preform, the binder becomes an inorganic oxide such as $SiO_2$, remains in the preform, and is contained in a composite body. Accordingly, it is preferable to appropriately select the type of the binder on the basis of the balance with the ceramic that is used as a raw material for forming a composite. For example, in the case where non-oxide-based ceramic such as SiC or $Si_3N_4$ is used, or in the case where oxide ceramic such as $Al_2O_3$ or $TiO_2$ is used, there is no problem in this regard when a silicone resin or a silica-based binder such as water glass is used. The amount of the binder that is used may be appropriately determined in consideration of processability in molding the mixture, hardness of the preform after calcining, and the like. For example, it is preferable to use the binder by adding approximately 0.3 parts by mass or more and approximately 110 parts by mass or less of the binder to 100 parts by mass of ceramic powder.

(Solvent)

The mixture that constitutes the present invention and is composed of the above-described raw materials is a mixture for obtaining a mixed body by performing molding using the mixture and for preparing a preform by calcining the mixed body at a temperature of 500° C. or lower. Therefore, in addition to the above-described materials, an organic solvent or a mixed solvent of water and an organic solvent can further be used for the purpose of improving moldability of the mixed body. As the organic solvent, lower alcohols such as ethanol and isopropyl alcohol, linear alkanes such as normal hexane, and the like can be used. Moreover, in the present invention, a mixed solvent of water and any of these organic solvents can also be used.

However, according to studies conducted by the present inventors, it has been found that when water is used, Mg in the Mg-containing powder in the mixture reacts with water to become a hydroxide, and a function as an infiltration (impregnation) promoter to be required in the preform may be damaged in some cases although this phenomenon depends on the amount of water that is used. That is, for example, in the cases where a metal Mg powder is used, if the Mg powder in the mixture has a large amount of water, hydrolysis occurs due to a reaction of $Mg+2H_2O \rightarrow 2Mg(OH)_2+H_2$, and as a result, $Mg_3N_2$ that is useful in the pressureless infiltration is not generated, and an effect of promoting the impregnation with a molten Al alloy may be damaged in some cases. Therefore, it is preferable to use an organic solvent that does not contain water or a water content-reduced mixed solvent as the solvent that is used in the mixture so that the Mg-containing powder constituting the mixture is not hydrolyzed. Specifically, when a mixed solvent of water and an organic solvent is used, it is important to reduce the amount of water that is used to 100 parts by mass or less based on 100 parts by mass of organic solvent. According to the studies conducted by the present inventors, not to mention when the organic solvents given above are used, but even when the water content-reduced mixed solvent is used, the Mg-containing powder in the mixture hardly reacts with water, and the Mg-containing powder exists in a state of the Mg-containing powder as it is in the mixed body obtained by molding the mixture. Therefore, it is possible to produce a preform that can be suitably used in pressureless infiltration by calcining the mixed body.

<Preparation of Mixed Body and Preform>

In the present invention, a mixed body is obtained by performing molding using the mixture constituted as described above, and the mixed body is calcined at a temperature of 500° C. or lower to prepare the preform. In the present invention, the mixed body is obtained by using the mixture constituted as described above, the preform is obtained by calcining the obtained mixed body at a temperature specified in the present invention, and thereby when the preform is used in the subsequent pressureless infiltration step, providing a useful preform that contains the Mg-containing powder in a state capable of stably and sufficiently exhibiting a function as an infiltration (impregnation) promoter and that has not been disclosed in the conventional techniques is realized. Hereinafter, this point will be described.

When a MMC product of a metal matrix composite that contains an Al alloy or the like and ceramic is obtained by utilizing the pressureless infiltration process, in preparation of a product having a simple shape, it is considered that for example, a mixture containing a ceramic powder and a Mg powder is put into a carbon box or the like, and a molten Al alloy or the like is caused to infiltrate into the mixture in the box to produce the product. On the other hand, when a MMC product having a complicated shape is produced, there is a demand for a production method in which a mixture containing a ceramic powder is molded and is hardened to prepare a preform having a shape close to the product, or the preform obtained in the manner as described above is machined as necessary to process the preform to have a shape closer to the product shape, and the preform is impregnated with a molten metal of an Al alloy or the like. That is, when a product can be produced by impregnating the preform having a shape close to the product shape with the Al alloy or the like in this manner, the processing cost of the product can be reduced, the product cost can be reduced, so that the product can be provided inexpensively.

However, in the conventional techniques, when a MMC product is produced using a preform having a shape close to a product shape by utilizing the pressureless infiltration process, a preform containing a metal Mg powder or the like has not been utilized. As described above, in the conventional techniques, a preform having a shape close to a product obtained by molding a mixture containing a ceramic powder is used, Mg that is an infiltration (impregnation) promoter is allowed to exist in an atmosphere in which pressureless infiltration is performed, and the molten Al alloy is caused to infiltrate without pressurization into the preform in a nitrogen atmosphere, and thus the MMC product has been obtained. According to studies conducted by the present inventors, the reason that the preform containing the metal Mg powder or the like has not been utilized in the conventional techniques is because of the following. The reason is due to the fact that in conventional techniques, development of a preform containing the metal Mg powder that stably and sufficiently exhibits a function as an infiltration (impregnation) promoter cannot be realized when the pressureless infiltration process is carried out. The present invention has been made in consideration of such a technical problem, and according to the present invention, it is possible to provide a preform that can be suitably utilized in the pressureless infiltration process, has sufficient strength, and contains the Mg-containing powder in a state capable of stably exhibiting the function as an infiltration (impregnation) promoter by simple means.

(Step of Preparing Mixed Body>

In the production method of the present invention, a method for obtaining a mixed body having a desired shape by using the mixture of a composition containing the above-described raw materials is not particularly limited. For example, conventional methods such as press molding, CIP molding (cold isostatic pressing), slip casting, and vibration molding can be used. As described above, the mixture that constitutes the present invention contains a unique binder which is an inorganic or organic/inorganic binder having a property of allowing the mixture to exhibit strength, such as hardening by heating of 500° C. or lower. Therefore, a resultant mixed body and a preform that is obtained by calcining the mixed body after obtaining the mixed body are excellent in handling performance and have a property that is easy to handle. Further, particularly, the preform obtained by calcining the mixed body has an excellent property such that the preform is strongly solidified and the preform does not collapse in the case where a molten Al alloy is caused to infiltrate into the preform (the preform is impregnated with a molten Al alloy) at a high temperature utilizing the pressureless infiltration process.

In the production method of the present invention, as an example in preparing the mixed body, a method as described below can be exemplified. First, an organic/inorganic binder such as a silicone resin is added to the ceramic powder and the metal Mg powder as described above, further, an organic solvent such as an alcohol or, if necessary, a mixed solvent containing a small amount of water is added to a resultant mixture, and the mixture is uniformly mixed to prepare a slurry. Then, the slurry obtained in the manner as described above is subjected to slip casting in a gypsum mold, a metal mold, a rubber mold, a resin mold, or the like to obtain a mixed body, or a method in which the slurry is subjected to vibration sedimentation molding, a solvent is thereafter dried and removed, and thus molding is performed to obtain a mixed body can be exemplified. In addition, according to the production method in which the slurry is poured into a gypsum mold, the mixed body can be molded while the gypsum mold is allowed to absorb a solvent in the mixture. In any case, as will be described later, the mixed body is taken out from the mold, and the mixed body is then calcined under a unique temperature condition, thereby making it possible to prepare a preform that can be suitably used in the production method of the present invention. In addition, the method for obtaining the mixed body is not limited to these methods, and a method in which the slurry obtained in the manner as described above is, for example, dried and pulverized to prepare a mixed powder, and the mixed powder is then filled into a mold and is subjected to press molding or CIP molding to obtain the mixed body can also be effectively utilized.

The above-described method for preparing the mixed body will be described more specifically.

"Press and CIP Molding Methods"

The slurry formed from the above-described mixture is dried at a temperature of 150° C. or lower and is loosened in such a way as to be easily molded after drying, or the slurry is lightly pulverized to prepare a powder raw material for press molding. The obtained powder raw material for press molding is put into a press mold, and a load is applied to the press mold to perform press molding or CIP molding. In this case, when it is difficult to mold the mixed body with only an inorganic binder, an organic binder may be appropriately used together with the inorganic binder in the slurry.

"Water Glass Hardening Method"

When water glass (sodium silicate) is used as the inorganic binder, the mixed body can be obtained in the manner as described below. After a mixture of a ceramic powder, water glass, and a Mg powder is put into a mold and is compacted, a carbon dioxide gas is blown to harden the compacted mixture, thereby making it possible to make a strongly solidified mixed body. This method is a method that is used to make sand such as silica into a mold for gravity casting. In the production method of the present invention, the mixed body is obtained by utilizing this method, and then the mixed body taken out from the mold is calcined, thereby making it possible to obtain the preform.

"Vibration Sedimentation Method"

The slurry formed from the above-described mixture is put into a rubber mold or the like and is subjected to vibration molding, then, a solvent on an upper part is removed, and then the resultant slurry from which the solvent has been removed is dried to prepare a mixed body. The obtained mixed body is calcined to make a preform, and thereby the preform can be favorably utilized in the production method of the present invention.

(Step of Preparing Preform)

The production method of the present invention has a characteristic such that the mixed body that is obtained in the manner as described above, has a desired shape, and contains unique raw materials specified in the present invention is taken out from the mold, is then dried as necessary, and is calcined at a temperature of 500° C. or lower to obtain a preform, and the obtained preform is used, and a molten metal of an Al alloy or the like is caused to infiltrate without pressurization into the preform (the preform is impregnated with the molten metal without pressurization) to obtain a metal matrix composite containing aluminum and ceramic. In the present invention, the mixed body of unique constitution is calcined and hardened at a temperature of 500° C. or lower in the air to prepare the preform. According to studies conducted by the present inventors, calcining temperature higher than 500° C. must be avoided. That is, when the calcining temperature is set to be higher than 500° C., the Mg-containing powder contained in the mixed body is oxidized in the air, thus a reaction of $2 \ Mg+O_2 \rightarrow 2MgO$ occurs, and therefore in the subsequent process of causing the molten metal of an Al alloy or the like to infiltrate into the preform, which is performed using the preform after calcining, or in the subsequent process of impregnating the preform with the molten metal, which is performed using the preform after calcining, an Al impregnation promoting effect is not exhibited.

According to studies conducted by the present inventors, when an organic/inorganic binder such as a silicone resin or a silicon alkoxide is used as the binder, an organic substance in the structure is combusted and decomposed near 500° C. into amorphous silica $SiO_2$, and as a result, a resultant preform exhibits strength. On the other hand, when water glass or alumina cement is used as the binder, the mixed body is hardened at an ordinary temperature, but the mixed body does not have sufficient strength by the hardening at an ordinary temperature. In contrast, in the production method of the present invention, since calcining is performed at a temperature of 500° C. or lower, the mixed body is hardened while unnecessary water or an unnecessary organic substance is removed from the mixed body, and the strength of the preform obtained after calcining can be made sufficient as amorphous silica or alumina. Therefore, in the subsequent pressureless infiltration to be performed at a high temperature, the molten metal of an Al alloy or the like quickly infiltrates into the preform after calcining, and thus sufficient strength is exhibited when impregnation with the molten metal is completed over the whole preform, and besides, it is possible to provide a composite in a uniform state as a whole.

Hereinafter, description will be given on the reason that the remarkable effect of the present invention, which cannot be obtained by conventional production methods, can be realized by preparing the preform to be provided to pressureless infiltration process setting the calcining temperature of the mixed body obtained by molding the mixture having a unique raw material composition including the above-described ceramic powder which characterizes the present invention to 500° C. or lower.

Generally, a ceramic preform is produced by a method as described below. An inorganic binder such as colloidal silica or colloidal alumina, and an organic binder that is added as necessary are added to a ceramic powder and a resultant mixture is mixed, then, the mixture is molded by press molding or the like to prepare a molded body, and thereafter a preform is prepared by calcining the molded body at a high temperature of 900° C. or higher in order to allow the preform to exhibit strength, and such a method is a general method. According to studies conducted by the present inventors, when a molded body is prepared using the ceramic powder containing a Mg-containing powder as a raw material and is then calcined by the above-described general method, the contained Mg-containing powder is oxidized to become MgO. Therefore, in pressureless infiltration step, $Mg_3N_2$ capable of dramatically improving wettability of the ceramic powder that forms the preform with an Al alloy is not generated. Therefore, in the case of a preform obtained by the general method, the preform cannot be impregnated with a molten metal of the Al alloy or the like without pressurization.

Here, as a method for preventing oxidation of Mg, calcining of the molded body in an inert atmosphere such as argon is conceivable. However, according to studies conducted by the present inventors, Mg in the molded body evaporates at a temperature of 600° C. or higher, and therefore a predetermined amount of Mg does not remain in the preform after calcining, and an effect obtained by adding the Mg-containing powder to the raw materials for the molded body is lowered. In addition, calcining of the molded body in a nitrogen atmospheric furnace is also conceivable. However, according to studies conducted by the present inventors, $Mg_3N_2$ is generated at approximately 550° C., but becomes $Mg(OH)_2$ through a reaction with moisture in the air when the preform is taken out from the inside of the furnace into the air after calcining, and in this case, the amount of Mg that can function as an infiltration (impregnation) promoter in the preform is reduced similarly. On the other hand, when the organic binder is added to the raw materials for preparing the molded body and is used in combination, an organic substance and Mg react with each other to generate MgO, and therefore $Mg_3N_2$ that effectively functions in the subsequent pressureless infiltration step cannot be generated. As described above, until now, there has been no conventional technique that produces a preform containing the Mg-containing powder in a state capable of functioning as an infiltration (impregnation) promoter capable of dramatically improving wettability of a ceramic preform with a molten metal of an Al alloy or the like in the pressureless infiltration step.

In contrast to the conventional techniques, in the production method of the present invention, as described above, the calcining temperature of the mixed body (molded body) containing a ceramic powder containing the Mg-containing powder such as a metal Mg powder in preparing the preform is set to 500° C. or lower, thereby the remarkable effect of the present invention has been realized. That is, when the calcining temperature is set to 500° C. or lower, thereby a component of the metal Mg powder or the like contained in the mixed body before calcining is not oxidized and does not evaporate when being calcined, and therefore $Mg_3N_2$ required for the subsequent pressureless infiltration step is generated favorably. This can be ascertained by the fact that in a composite body obtained by the production method of the present invention, the infiltration of the molten metal of the Al alloy into the ceramic preform has been performed in a favorable manner. Specifically, in the production method of the present invention, this can be ascertained by the fact that the speed of infiltration of Al into the ceramic preform without pressurization is dramatically increased, and in the resultant composite body, the molten Al alloy or the like uniformly infiltrates into the whole of the preform, and an impregnation state is favorable.

<Pressureless Infiltration Step>

Although depending on the molding method, the preform prepared by method as described above is released from a mold and is used as it is or is machined as necessary into a preform shape that is closer to a product shape, and is provided for use in the pressureless infiltration step. The pressureless infiltration step in the production method of the present invention is the same as a usual method except that the preform, which is obtained by calcining the mixed body obtained by molding the mixture containing materials specified in the present invention at 500° C. or lower and has sufficient strength capable of enduring the pressureless infiltration step, is used, and the Mg-containing powder that functions as an infiltration (impregnation) promoter is contained in the preform.

As shown in FIG. 1 and FIG. 2(*a*), the preform 1 having unique constitution that characterizes the present invention, and the Al alloy or the like 4 are put into the container 3 made of carbon or the like, and this container 3 is installed inside a furnace (not shown) in which an atmosphere can be controlled. Then, as shown in FIG. 2(*b*) to FIG. 2(*d*), the container 3 is retained inside the nitrogen atmospheric furnace of 700° C. to 900° C. for approximately 2 to 10 hours so as to cause the molten Al alloy or the like 4 to infiltrate into gaps of the preform 1 through the infiltration channel 2 for impregnation. The amount of the Al alloy or the like 4 disposed inside the container 3 needs to be equal to or greater than the volume that fills the gaps (voids) between particles of the preform 1. Generally, approximately 1.2 or more times the void is necessary. As shown in FIG. 2(*d*), after the whole of the gaps of the preform 1 is impregnated with the Al alloy or the like 4, the preform 1 is cooled and the residual Al alloy or the like 4 is taken out (removed) (not shown), thereby obtaining a composite body (MMC) 5 in which the preform 1 has been impregnated with the Al alloy or the like 4. The composite body obtained by the production method of the present invention has no void, and is a composite body formed from ceramic and an Al alloy or the like.

In the production method of the present invention, since the preform containing the Mg-containing powder in a state of functioning as an infiltration (impregnation) promoter is used, and therefore the impregnation speed of the preform with the Al alloy or the like is remarkably faster than that in conventional techniques. According to studies conducted by the present inventors, for example, with regard to a preform having a shape in which the thickness is 500 mm or 100 mm, uniform impregnation is completed in 2 to 7 hours. In contrast, when a preform that does not contain Mg in the conventional techniques is used, the impregnation speed is slow, and long impregnation time that is approximately 3 to approximately 10 times is required to impregnate a preform, which has the same shape as in the preform having the constitution of the present invention which is used in the present invention, with the molten metal of the Al alloy or the like by any of the conventional methods. In addition, in the conventional methods, the impregnation speed into the inside of the preform is slow, and therefore the Al alloy or the like surrounds the whole of the periphery of the preform excluding an infiltration (impregnation) inlet, so that a problem is also brought about that it is not easy to remove the surplus Al alloy or the like from a resultant composite body after impregnation. In contrast, according to the production method of the present invention, impregnation with the molten Al alloy or the like occurs from only an inlet part of the preform in a short time, and therefore surrounding of the periphery of the resultant composite body by the Al alloy or the like that does not contribute to the impregnation is significantly reduced. As described above, according to the production method of the present invention, and therefore the composite body (MMC) can be produced in a near-net shape, a load of the subsequent processing or the like is reduced, and thus productivity can be dramatically improved.

EXAMPLES

Hereinafter, further specific examples of the above-described embodiment will be described giving Examples and Comparative Examples, but the present invention is not limited to the following Examples. In the following description, w % is on a mass basis, v % is on a volume basis. The average particle size as used herein is a value that is measured by a laser diffraction type particle size distribution analyzer.

Example 1

A silicone resin (trade name: KR-220L, manufactured by Shin-Etsu Chemical Co., Ltd.) was dissolved in isopropyl alcohol (IPA) to prepare a 30 w % binder solution in advance. As a ceramic powder, 4000 g of a SiC powder having an average particle size of 50 μm and 1200 g of SiC powder having an average particle size of 14 μm were used, and 104 g of a Mg powder having an average particle size of 75 μm was added to the ceramic powder (SiC powder) so as to be contained in a proportion of 2 w %, thereby preparing a mixture containing the Mg powder and the ceramic powder. Further, 346 g of the 30 w % binder solution prepared in advance was added to the mixture so that 2 w % of the silicone resin was blended to the ceramic powder. Then, 1300 g of IPA was further added thereto, and a resultant mixture was uniformly mixed with a ball mill to prepare a slurry. The obtained slurry was put into a stainless steel container, was naturally dried to remove the IPA almost completely, and was further dried by a drier set to 60° C. for 8 hours. After drying, a resultant dried product was pulverized (crushed) with a ball mill which 20 mmφ plastic balls were put into to prepare a powder raw material for press molding.

The powder raw material for press molding obtained above in an amount of 1000 g was put into a press mold having dimensions of 100 mm×100 mm×100 mm in depth, and was press-molded at a pressure of 150 kg/cm² to obtain a mixed body having dimensions of 100 mm×100 mm×50 mm. The mixed body obtained as described above was put into an electric furnace set to an air atmosphere, and the temperature was raised up to 500° C. at a rate of 50° C./hour and was retained at 500° C. for 4 hours to calcine the mixed body, and thereafter, cooling was performed to prepare a preform. In the obtained preform, a filling rate of the SiC powder was 63 v %.

As shown in FIG. 1, the preform 1 (hereinafter, referred to as preform main body 1) prepared above was disposed inside the carbon container 3 having dimensions of 200 mm×200 mm×80 mm in depth. On that occasion, three infiltration channels 2: which were obtained by cutting and processing a preform prepared by the same method and formed from the same materials as in preparing the preform main body 1; which have dimensions of 20 mm×20 mm×20 mm in height; and which are for infiltration of the Al alloy or the like, were installed below the preform main body 1, and the preform main body 1 was supported and raised by the infiltration channels 2. As the Al alloy 4, 1000 g of AC3A the weight of which was adjusted through cutting was placed beside the preform main body 1 disposed inside the container 3 in that manner, and the container 3 was installed in a nitrogen atmospheric furnace having inner dimensions of 600 mm×600 mm×500 mm in height. Then, the temperature was raised from room temperature to 800° C. at a rate of 10° C./min while flowing nitrogen to the atmospheric furnace at a rate of 5 L/min, and the temperature was retained at this temperature for 5 hours.

After the temperature was retained at 800° C. for 5 hours, cooling to room temperature was performed, and then a composite body (MMC) in which the Al alloy was caused to infiltrate into the preform was taken out from the atmospheric furnace. Then, the three infiltration channels 2 used to support the preform main body 1 were removed, thereby obtaining the composite body (MMC) 5 in which the Al alloy 4 infiltrated into the preform main body 1. As described above, in the container 3 installed inside the nitrogen atmospheric furnace retained at a temperature of 800° C. for 5 hours, AC3A that is the Al alloy 4 disposed inside the container 3 is melted, and the molten Al alloy 4 infiltrates without pressurization into the preform main body 1 that is a porous body through the infiltration channels 2.

With regard to the composite body of the present Example, obtained in the manner as described above, a bulk specific gravity was measured by an Archimedes method, and, in addition, the inside of the composite was cut with a diamond cutter, and the cut surface was observed with a microscope. As a result, it was ascertained that the gaps of the preform main body was completely impregnated with the Al alloy through observation of the cut surface. In addition, from the calculation result of the bulk specific gravity, it was ascertained that the composite of the present Example was a composite body (MMC) containing 63 v % of SiC and 37 v % of AC3A.

Example 2

To 4000 g of an alumina powder having an average particle size of 15 μm, 120 g of a Mg powder having an average particle size of 75 μm was added so as to be contained in a ratio of 3 w % to the amount of the alumina powder, thereby preparing a mixture containing the Mg powder and the ceramic powder. Further, a slurry was prepared using the mixture in the same manner as in Example 1. Specifically, the slurry was prepared as follows using the mixture obtained as described above and a binder solution. In the present Example, 400 g of a 30 w % binder solution of the same silicone resin as used in Example 1 and further and 1400 g of IPA were added so that 3 w % of the silicone resin was blended, and the resultant mixture was uniformly mixed with a ball mill in the same manner as in Example 1, thereby preparing the slurry.

Approximately ¼ of the slurry prepared above was put into a gypsum mold having dimensions of 110 mm×110 mm×60 mm in depth, and vibration was applied to the gypsum mold for approximately 30 minutes in order for a solution in the slurry to be absorbed to the gypsum mold, thereby removing the solution from the slurry. Thereafter, drying was performed at 60° C. for approximately 8 hours for solidification, and a mixed body containing the Mg powder and the ceramic powder was taken out from the gypsum mold. The obtained mixed body was calcined at a temperature of 500° C. under the same conditions as in Example 1. As a result, a calcined product having dimensions of 100 mm×100 mm×50 mm was obtained. With regard to the obtained calcined product, the weight and the shape were measured to measure a bulk specific gravity. As a result, a preform containing 50 v % of alumina was obtained.

In the same manner as in Example 1, the preform obtained above was disposed inside a carbon container in a state where the preform main body is raised by infiltration channels, and by the same method as in Example 1, the same Al alloy was caused to infiltrate into the preform, thereby obtaining a composite body. With regard to the obtained composite body, the inside was cut, the cut surface was observed with a microscope, and in addition, the bulk specific gravity was measured. As a result, it was ascertained that the gaps of the preform main body was completely impregnated with the Al alloy through observation of the cut surface. In addition, from the calculation result of the bulk specific gravity, it was ascertained that the obtained composite body is a composite body (MMC) containing 50 v % of alumina and 50 v % of the Al alloy.

Example 3

To 2000 g of a SiC powder having an average particle size of 50 μm and 600 g of a SiC powder having an average particle size of 14 μm, 78 g of a Mg powder having an average particle size of 75 μm was added, and 80 g of No. 3 liquid water glass was further added, and a resultant mixture was stirred with a stirrer. The obtained mixture was put into a silicone resin mold having dimensions of 100 mm×100 mm×100 mm in depth, the mixture was filled while being tapped with a stick, a carbon dioxide gas was sprayed to the filled product to infiltrate into the filled product and to be solidified, thereby obtaining a mixed body having dimensions of 100 mm×100 mm×52 mm. The obtained mixed body was dried at 60° C. for approximately 8 hours. Then, a preform was prepared in the same manner as in Example 1 except that the temperature was raised up to 450° C. at a rate of 50° C./hour, and after reaching 450° C., the temperature was retained for 4 hours to calcine the mixed body.

Infiltration of a molten metal of an Al alloy into the preform obtained above was performed in the same manner as in Example 1, thereby obtaining a composite body. Then, with regard to the obtained composite body, the inside was cut, the cut surface was observed with a microscope, and in addition, the bulk specific gravity was measured. As a result, from the calculation result of the bulk specific gravity, it was ascertained that a composite body (MMC) having a SiC filling rate of 54 v % and containing 46 v % of the Al alloy can be produced. In addition, from the observation of the cut surface, it was ascertained that even in present Example using a preform solidified by water glass used as the binder, a composite body (MMC) in which gaps of the preform main body is completely impregnated with the Al alloy can be produced.

Examples 4 and 5

In the same manner as in Example 1, an Al alloy was caused to infiltrate without pressurization through the infiltration channels into a preform main body that is a preform having a Sic powder filling rate of 63 v %, which was prepared in the same manner as in Example 1: in Example 4, AC4C that is an Al alloy was used in place of AC3A that is the Al alloy used in Example 1; and in Example 5, Al-3Mg that is an Al alloy containing magnesium was used in place of AC3A that is the Al alloy used in Example 1. As a result, in any of the Examples, a composite body (MMC) in which the Al alloy completely infiltrated into the preform up to a height of 50 mm as in Example 1 was obtained. In addition, from the calculation result of the bulk specific gravity, it was ascertained that a composite body (MMC) containing 60 v % of SiC and 40 v % of the Al alloy was obtained in any of the Examples.

Example 6

In the same manner as in Example 1, 4000 g of the SiC powder having an average particle size of 50 µm and 1200 g of the SiC powder having an average particle size of 14 µm were used as the ceramic powder, and 52 g of the Mg powder having an average particle size of 75 µm was added to the ceramic powder so as to be contained in an amount of 1 w %, thereby preparing a mixture containing the Mg powder and the SiC powders. As the organic/inorganic binder, an oligomer (40 w % was contained in terms of $SiO_2$) of ethyl silicate $Si(OC_2H_5)_4$ was used, and 260 g of the oligomer was added to the mixture so that 2 w % of this organic/inorganic binder in terms of $SiO_2$ was blended to the ceramic powder. Then, 1200 g of isopropyl alcohol (IPA) was further added thereto, and a resultant mixture was uniformly mixed with a ball mill in the same manner as in Example 1, thereby preparing a slurry.

The slurry obtained above was used, and dried and crushed (pulverized) by the same operation as in Example 1 to prepare a powder raw material for press molding. Then, the obtained powder raw material for press molding was used, and press-molded in the same manner as in Example 1 to prepare a mixed body having a shape of 100 mm×100 mm×50 mm. The obtained mixed body was put into an electric furnace set to an air atmosphere, and was calcined at 430° C. to prepare a preform. The obtained preform was used, and AC3A that is an aluminum alloy was caused to infiltrate without pressurization into the preform by the same operation and under the same conditions as in Example 1 to obtain a composite body. From the calculation result of the bulk specific gravity, it was ascertained that the obtained composite body is MMC containing 64 v % of SiC and 36 v % of AC3A.

Comparative Example 1

A preform was prepared in the same manner as in Example 1 except that the Mg powder was not added in preparing the powder raw material for press molding. Then, AC3A that is an Al alloy was used, and the Al alloy was caused to infiltrate without pressurization using the obtained preform in the same procedure as in Example 1. As a result, the preform was not impregnated with the Al alloy.

Comparative Example 2

A preform having dimensions of 100 mm×100 mm×50 mm was prepared in the same manner as in Example 1 except that the Mg powder was not added in preparing the powder raw material for press molding. Then, AC3A that is an Al alloy was used, and the Al alloy was caused to infiltrate without pressurization into the above-obtained preform as follows. Specifically, the infiltration of the Al alloy into the preform was performed by the same method as in Example 1 except that 5 g of Mg powder was placed below the preform and at the periphery thereof (not shown) in installing the preform inside the container 3 as shown in FIG. 1.

The above-described process has been performed conventionally, and is referred to as "Lanxide process."

After the infiltration step, the state of the preform was observed. As a result, the Al alloy infiltrated up to a height of approximately 8 mm (16%) from the lower part of the preform the thickness of which was 50 mm, but the whole of the preform was not impregnated with the Al alloy. In addition, the Al alloy surrounded the periphery of the preform, and therefore the preform was not of a near-net shape.

Comparative Example 3

The Al alloy was caused to infiltrate into the preform using the Lanxide process in the same manner as in Comparative Example 2. Specifically, a preform which was obtained in the same manner as in Comparative Example 2 and to which the Mg powder was not added was used, and the infiltration of the Al alloy into the preform was performed by the same method as in Example 1 except that 100 g of a SiC powder to which Mg was mixed in an amount of 5% was laid below the preform in installing the preform inside the container 3 as shown in FIG. 1.

After the above-described infiltration step, the state of the preform was observed with a microscope. As a result, the Al alloy infiltrated up to a height of approximately 10 mm (20%) from the lower part of the preform the thickness of which was 50 mm, but the whole of gaps was not impregnated with the Al alloy. In addition, the Al alloy surrounded the periphery of the preform, and therefore MMC of a near-net shape was not obtained.

Comparative Examples 4 and 5

In the present Comparative Examples, a mixed body having dimensions of 100 mm×100 mm×50 mm was obtained in the same manner as in Example 1 using a powder raw material for press molding which was obtained by the same method as in Example 1, and the obtained mixed body was put into an electric furnace set to an air atmosphere, was dried at 60° C. for 8 hours, and was then calcined to prepare a preform. On that occasion, the calcining temperature in preparing the preform in Example 1 was changed to 550° C. in Comparative Example 4, and was changed to 600° C. in Comparative Example 5, and therefore in any of these Comparative Examples, calcining was performed at a temperature higher than a temperature specified in the present invention. As described above, AC3A that is an Al alloy was caused to infiltrate into each of the preforms by the same method as in Example 1 except that the preforms each obtained by changing the calcining temperature were used respectively.

After the infiltration step, the state of the preforms used respectively was observed. As a result, the Al alloy did not permeate at all into the gaps of the preform in any of the Comparative Examples. With regard to this point, the present inventors consider as follows. That is, this is due to the fact that particularly when the calcining in preparing a preform is performed at a temperature higher than 500° C., Mg contained in the mixed body is oxidized, and the infiltration (impregnation) promoting effect obtained due to existence of Mg in the preform is impaired.

Comparative Example 6

An attempt was made to prepare a preform by the same method as in Example 1 except that an alcohol-based colloidal silica (5 mμ) was used in place of the silicone resin as the binder used in preparing the powder raw material for press molding, and the binder was added for mixing to the ceramic powder so as to be a concentration of 5%. Specifically, a mixture having the same composition as in Example 1 was used except that the colloidal silica was used as the binder, the mixture was press-molded to obtain a mixed body, and the obtained mixed body was calcined at 500° C. However, the mixed body was not hardened at a temperature of 500° C., and therefore a preform that can be utilized in the pressureless infiltration process was not able to be prepared.

Comparative Example 7

When the mixed body obtained in Comparative Example 6 using the colloidal silica as the binder was used, and the mixed body was calcined at 1000° C. changing the calcining temperature, a preform was able to be obtained. An attempt was made to cause the molten metal of the Al alloy to infiltrate without pressurization using the obtained preform and using AC3A that is an Al alloy in the same manner as in Example 1, but the Al alloy did not infiltrate at all. It is considered that this is because Mg in the mixed body was completely oxidized when being calcined at 1000° C., and therefore Mg did not exist in the preform.

TABLE 1

| | Method for molding mixed body | Binder | Amount of Mg added [w %] | Temperature of calcining preform [°C] | Type of Al alloy | Internal state of composite after infiltration |
|---|---|---|---|---|---|---|
| Example 1 | Press | Silicone resin | 2 | 500 | AC3A | 100% impregnation |
| Example 2 | Slip casting | Silicone resin | 3 | 500 | AC3A | 100% impregnation |
| Example 3 | CO₂ Hardening | Water glass | 3 | 450 | AC3A | 100% impregnation |
| Example 4 | Press | Silicone resin | 2 | 450 | AC4C | 100% impregnation |
| Example 5 | Press | Silicone resin | 2 | 500 | Al - 3 Mg | 100% impregnation |
| Example 6 | Press | Si alkoxide | 1 | 430 | AC3A | 100% impregnation |
| Comparative Example 1 | Press | Silicone resin | Not added | 500 | AC3A | No impregnation |
| Comparative Example 2 | Press | Silicone resin | Mg atmosphere | 500 | AC3A | 16% impregnation |
| Comparative Example 3 | Press | Silicone resin | Mg atmosphere | 500 | AC3A | 20% impregnation |
| Comparative Example 4 | Press | Silicone resin | 2 | 550 | AC3A | No impregnation |
| Comparative Example 5 | Press | Silicone resin | 2 | 600 | AC3A | No impregnation |
| Comparative Example 6 | Press | Colloidal silica | 2 | 500 | AC3A | Preform unhardened |
| Comparative Example 7 | Press | Colloidal silica | 2 | 1000 | AC3A | No impregnation |

Conditions for preparing a preform and a characteristic of resultant composite in Examples and Comparative Examples

REFERENCE SIGNS LIST

1: Preform or preform main body
2: Infiltration channel
3: Container made of carbon or the like
4: Al alloy or the like
5: Composite body (MMC) (a preform forming a composite by having been impregnated with the Al alloy or the like)

The invention claimed is:

1. A method for producing a composite, comprising:
performing molding by using a mixture so as to form a mixed body, the mixture comprising: a magnesium-containing powder, a ceramic powder, and an inorganic binder or an organic/inorganic binder, and the binder being hardened when heated to 500° C. or lower,
wherein to the mixture, an organic solvent or a mixed solvent that comprises 100 parts by mass or less of water based on 100 parts by mass of an organic solvent is added;
calcining the mixed body at a temperature of 500° C. or lower so as to form a preform; and
causing metal aluminum or an aluminum alloy to infiltrate without pressurization into the obtained preform in a nitrogen atmosphere to produce a metal matrix composite comprising aluminum and ceramic.

2. The method for producing a composite according to claim 1, wherein the magnesium-containing powder is a powder being at least one material in powder form selected from the group consisting of metal magnesium, a magnesium alloy, and magnesium silicide and has an average particle size in a range from 0.5 μm to 150 μm.

3. The method for producing a composite according to claim 1, wherein the magnesium-containing powder is contained in the mixture within a range from 0.3% to 10% based on 100 parts by mass of the ceramic powder in terms of magnesium on a mass basis.

4. The method for producing a composite according to claim 1, wherein the inorganic binder is water glass, and the organic/inorganic binder is at least one material selected from the group consisting of a silicone resin, a Si alkoxide, and an Al alkoxide.

5. The method for producing a composite according to claim 1, wherein the organic solvent and the organic solvent in the mixed solvent are each independently at least one solvent selected from the group consisting of lower alcohols and normal alkanes.

6. The method for producing a composite according to claim 1, wherein the mixed body is calcined at a temperature in a range from 430° C. to 500° C.

7. A method for preparing a ceramic preform applicable to production of an aluminum-based metal matrix composite by utilizing a pressureless infiltration process, and the method comprising:

performing molding by using a mixture so as to form a mixed body, the mixture comprising: a magnesium-containing powder, a ceramic powder, and an inorganic or organic/inorganic binder, and the binder being hardened when heated to 500° C. or lower, wherein to the mixture, an organic solvent or a mixed solvent that comprises 100 parts by mass or less of water based on 100 parts by mass of an organic solvent is added; and calcining the obtained mixed body at a temperature of 500° C. or lower so as to form the preform.

\* \* \* \* \*